US 12,167,123 B2

(12) United States Patent
Haga (10) Patent No.: US 12,167,123 B2
(45) Date of Patent: Dec. 10, 2024

(54) IMAGE PROCESSING DEVICE TO GENERATE PREVIEW IMAGE AND IMAGE PROCESSING METHOD TO GENERATE PREVIEW IMAGE

(71) Applicant: Morpho, Inc., Tokyo (JP)

(72) Inventor: Yuto Haga, Tokyo (JP)

(73) Assignee: Morpho, Inc., Tokyo (JP)

(*) Notice: Subject to any disclaimer, the term of this patent is extended or adjusted under 35 U.S.C. 154(b) by 0 days.

(21) Appl. No.: 18/073,562

(22) Filed: Dec. 2, 2022

(65) Prior Publication Data

US 2023/0199298 A1  Jun. 22, 2023

(30) Foreign Application Priority Data

Oct. 4, 2021 (JP) .................... 2021-163345

(51) Int. Cl.
*H04N 23/63* (2023.01)
*G06T 5/92* (2024.01)
*H04N 23/69* (2023.01)

(52) U.S. Cl.
CPC ............. *H04N 23/632* (2023.01); *G06T 5/92* (2024.01); *H04N 23/69* (2023.01)

(58) Field of Classification Search
CPC .... H04N 23/632; H04N 23/69; H04N 23/698; H04N 23/90; G06T 5/009
See application file for complete search history.

(56) References Cited

U.S. PATENT DOCUMENTS

| 10,412,298 | B2* | 9/2019 | Li | H04N 23/741 |
| 2010/0245630 | A1* | 9/2010 | Kurokawa | H04N 23/69 |
| | | | | 348/240.99 |
| 2018/0160046 | A1* | 6/2018 | Nash | H04N 23/69 |
| 2018/0183982 | A1 | 6/2018 | Lee et al. | |
| 2021/0368104 | A1* | 11/2021 | Bian | H04N 23/60 |

FOREIGN PATENT DOCUMENTS

WO  WO-2020155656 A1 *  8/2020  ........... H04N 5/2258

* cited by examiner

*Primary Examiner* — Padma Haliyur
(74) *Attorney, Agent, or Firm* — JCIPRNET

(57) ABSTRACT

Examples of an image processing device includes a first camera, a second camera having a different angle of view from the first camera, a processor configured to generate a preview image from an image captured by the first camera and an image captured by the second camera, and a display configured to display the preview image. In a case of a change in camera usage from the first camera to the second camera due to a change in a zoom magnification, a tone of an image that was captured by the second camera and is to be displayed first on the display is brought closer to a tone of an image that was captured by the first camera and was displayed last on the display, in comparison with a case where the captured images are used as-is.

2 Claims, 9 Drawing Sheets

IMAGE PROCESSING DEVICE TO GENERATE PREVIEW IMAGE AND IMAGE PROCESSING METHOD TO GENERATE PREVIEW IMAGE

TECHNICAL FIELD

The present disclosure relates to an image processing device and an image processing method.

BACKGROUND

US 2018/0183982A1 discloses a device that includes two cameras. The device includes a wide-angle camera with a wide-angle lens and a telephoto camera with a telephoto lens. The device displays a zoom preview image by switching between an image captured by the wide-angle camera (hereinafter also referred to as a wide-angle camera image) and an image captured by the telephoto camera (hereinafter also referred to as a telephoto camera image). The wide-angle camera and the telephoto camera may be misaligned to an extent within the manufacturing tolerance. The device warps (distorts) the wide-angle camera image and the telephoto camera image based on parameters indicating the misalignment. As a result, misalignment that occurs between the wide-angle camera image and the telephoto camera image due to misalignment between the cameras is suppressed, and even if the camera is switched while a zoom preview image is being displayed, the device can seamlessly switch between the displayed zoom preview images.

With the device described in US 2018/0183982A1, by aligning the wide-angle camera image and the telephoto camera image, it is possible to suppress a discontinuous positional change between images when switching the camera, but there is room for improvement in terms of further suppressing problems in the user viewing experience.

SUMMARY

Some examples described herein may address the above-described problems.

Some examples described herein may provide a device that enables suppressing a discontinuous change between images when switching between cameras that have different angles of view.

In some examples, an image processing device includes a first camera, a second camera having a different angle of view from the first camera, a processor configured to generate a preview image from an image captured by the first camera and an image captured by the second camera, and a display configured to display the preview image, wherein in a case of a change in camera usage from the first camera to the second camera due to a change in a zoom magnification, a tone of an image that was captured by the second camera and is to be displayed first on the display is brought closer to a tone of an image that was captured by the first camera and was displayed last on the display, in comparison with a case where the captured images are used as-is.

DESCRIPTION OF EMBODIMENTS

Embodiments of the present disclosure will be described below with reference to the drawings. In the following description, constituent elements that are the same or correspond to each other are denoted by the same reference numerals, and redundant descriptions will not be given for such constituent elements.

First Embodiment (Configuration of Image Processing Device)

Figure 1:
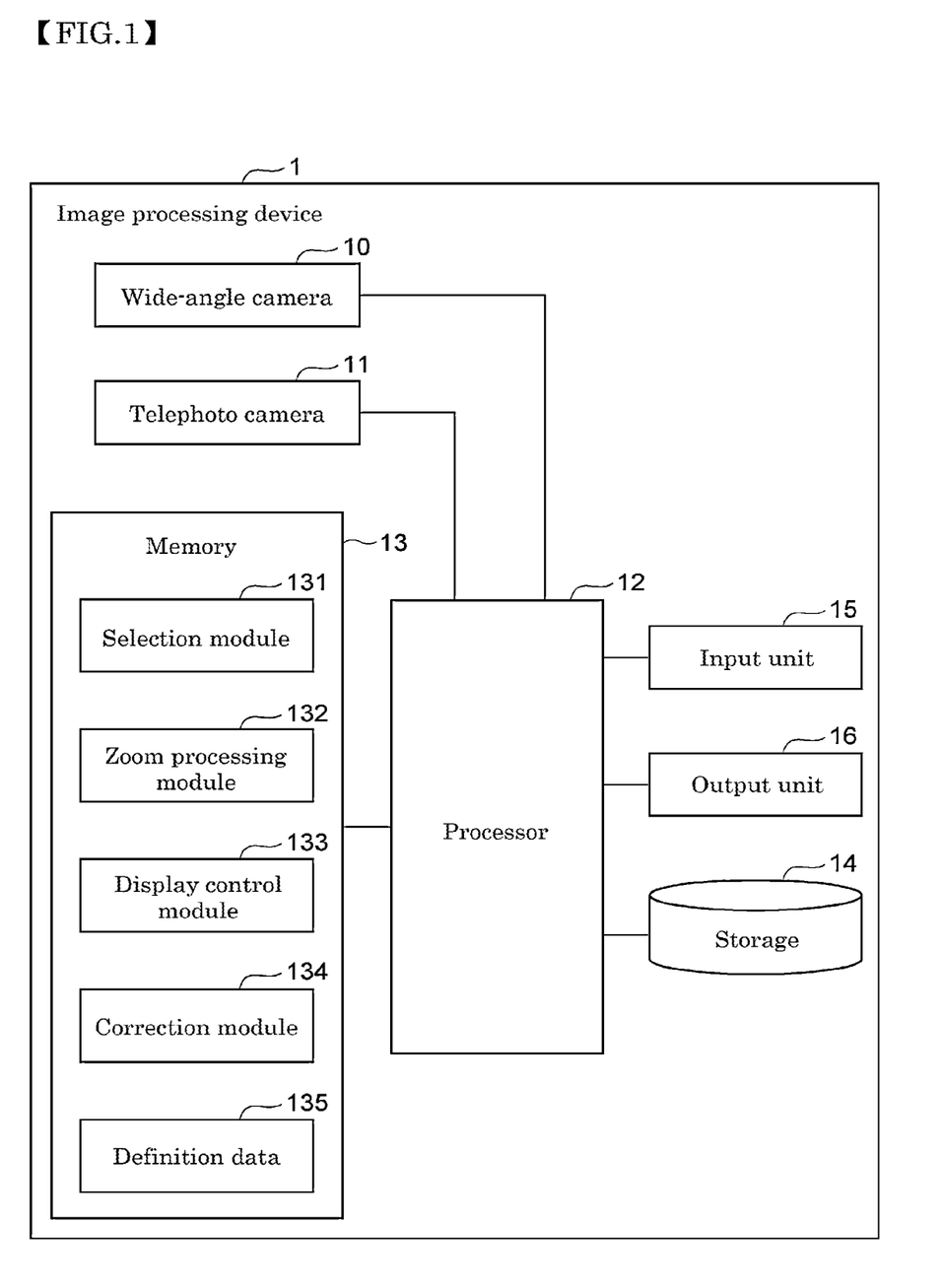
FIG. 1 is a block diagram showing an example of the hardware configuration of an image processing device.

FIG. 1 is a block diagram showing the hardware configuration of an image processing device according to the present embodiment. An image processing device 1 shown in FIG. 1 is a device that has an image capturing function, such as a smartphone. As shown in FIG. 1, the image processing device 1 includes a wide-angle camera 10 (an example of a first camera), a telephoto camera 11 (an example of a second camera), a processor 12, a memory 13 (an example of a storage unit), a storage 14, an input unit 15, and an output unit 16. The processor 12 is communicably connected to the wide-angle camera 10, the telephoto camera 11, the memory 13, the storage 14, the input unit 15, and the output unit 16.

The wide-angle camera 10 and the telephoto camera 11 have different angles of view. The wide-angle camera 10 is a camera provided with a wide-angle lens and has a larger angle of view and a shorter focal length than the telephoto camera 11. The wide-angle camera 10 can capture wide-angle images that cover a wide angle of view. The telephoto camera 11 is a camera provided with a telephoto lens and has a smaller angle of view and a longer focal length than the wide-angle camera 10. The telephoto camera 11 can capture high-resolution images of distant objects. The wide-angle camera 10 and the telephoto camera 11 respectively output a wide-angle camera image and a telephoto camera image as image data.

The processor 12 is an arithmetic device that executes image processing, and is an ISP (Image Signal Processor) optimized for image signal processing, for example. Besides an ISP, the processor 12 may also be a GPU (Graphics Processing Unit) or a CPU (Central Processing Unit). The processor 12 performs image processing on image data output from the wide-angle camera 10 and the telephoto camera 11.

The memory 13 and the storage 14 are storage media. In the example shown in FIG. 1, the memory 13 stores program modules executed by the processor 12, definition data, image data, and the like. The memory 13 is an SDRAM (Synchronous Dynamic Random Access Memory), for example. The storage 14 stores image data that has undergone image processing, for example. The storage 14 is an HDD (Hard Disk Drive), for example. There are no particular limitations on the memory 13 and the storage 14 as long as they are storage media. The memory 13 and storage 14 may be configured by a single piece of hardware.

The memory 13 stores a selection module 131 (an example of a selection unit), a zoom processing module 132 (an example of a zoom processing unit), a display control module 133 (an example of a display control unit), a correction module 134 (an example of a correction unit), and definition data 135, which are for realizing later-described image processing.

The input unit 15 is a user interface for receiving user operations, and is an operation button, for example. The output unit 16 is a device for displaying image data, and is a display device, for example. The input unit 15 and the output unit 16 may be configured by a single piece of hardware such as a touch screen.

(Overview of Image Processing)

Based on the zoom processing module 132, the processor 12 of the image processing device 1 realizes a single-lens reflex camera zoom lens function through image processing. The processor 12 crops the central portion of an image in accordance with the zoom magnification and performs enlargement processing to enlarge the cropped portion to the original resolution. Accordingly, an image zoomed by a desired magnification greater than 1 can be obtained from image data obtained by one camera. Hereinafter, the processing described above will be referred to as zoom processing. Based on the display control module 133, the processor 12 causes the output unit 16 to display the zoomed image as a preview screen. By continuously increasing the magnification, the processor 12 can cause the output unit 16 to display a preview screen that is smoothly zoomed-in. Also, by continuously decreasing the magnification, the processor 12 can also cause the output unit 16 to display a preview screen that is smoothly zoomed-out.

By combining the wide-angle characteristics of the wide-angle camera 10 and the high-resolution characteristics of the telephoto camera 11, the processor 12 performs wide-range zoom processing that spans the angles of view of both of the cameras. Based on the selection module 131, the processor 12 selects either the wide-angle camera 10 or the telephoto camera 11 in accordance with the set zoom magnification. For example, the processor 12 selects the wide-angle camera 10 if the zoom magnification is less than 1.0, and selects the telephoto camera 11 if the zoom magnification is 1.0 or more. Based on the zoom processing module 132, the processor 12 cuts out a region having a size corresponding to the zoom magnification from an image captured by the selected camera, and performs zoom processing to enlarge the cut out region. Based on the display control module 133, the processor 12 causes the display to display the image obtained by the zoom processing. In this manner, processor 12 selects a camera for capturing an image to be displayed on the preview screen during zoom processing, based on a predetermined switching threshold value.

Here, the wide-angle camera 10 and the telephoto camera 11 have different angles of view, lens distortion characteristics, lens optical axes, tones, and the like. In particular, the internal processing performed by the wide-angle camera 10 and the telephoto camera 11 to generate image data includes tone mapping processing and the like, and the difference in tone between the wide-angle camera 10 and the telephoto camera 11 is often non-linear and non-uniform. If the zoom processing for cropping the central portion of an image according to the zoom magnification and enlarging the central portion to the original resolution is executed as-is without taking the aforementioned differences into account, discontinuous change will occur between images when the camera (lens) is switched, which may lead to a problem in the user viewing experience. For this reason, in zoom processing, when switching from the wide-angle camera 10 to the telephoto camera 11, or when switching from the telephoto camera 11 to the wide-angle camera 10, it is necessary to avoid a discontinuous change between images.

The processor 12 can first perform correction for a change in image position resulting from a difference in the angle of view, the lens distortion characteristics, and the lens optical axis between the wide-angle camera 10 and the telephoto camera 11. In other words, the processor 12 can adjust the zoomed image of one camera and the zoomed image of the other camera to obtain the same angle of view. For example, parameters regarding the angles of view of the wide-angle camera 10 and the telephoto camera 11 are stored in the memory 13 in advance as part of the definition data 135. The processor 12 can compensate for a change in image position caused by different angles of view in accordance with the parameters stored in the memory 13. The processor 12 can correct for a change in image position caused by a difference in lens distortion characteristics based on the distance from the image center and a lens distortion model. Furthermore, a homography matrix for the wide-angle camera 10 and the telephoto camera 11 is stored in the memory 13 in advance as part of the definition data 135. Also, in order to more accurately correct such a change in the position of the image, the processor 12 may be caused to execute so-called auto-calibration, in which the definition data 135 is corrected each time the user performs image capturing with the image processing device 1. Based on the homography matrix stored in the memory 13, a change in image position caused by the difference in the lens optical axis can be corrected by the processor 12 with reference to the point at infinity. Such image correction processes are hereinafter referred to as alignment. Note that alignment may be performed by an external image processing device instead of the image processing device 1. In this case, it is sufficient that the image processing device 1 acquires the aligned image.

The processor 12 subjects the aligned image to correction for the difference in tone between the wide-angle camera 10 and the telephoto camera 11 based on the correction module 134. When the camera is switched, based on the color component relationship between the wide-angle camera image and the telephoto camera image, the processor 12 performs correction to bring the tone of the zoomed image to be displayed immediately after the switch closer to the tone of the zoomed image that was displayed immediately before the switch. Here, the processor 12 performs correction such that, in a predetermined zoom magnification range (between 1.0 and 1.2 in the example shown in FIG. 3), the tone of the zoomed image obtained from the telephoto camera image is brought closer to the tone of the wide-angle camera image whose angle of view has been matched to that of the zoomed telephoto camera image. The color component relationship between the wide-angle camera image and the telephoto camera image is a tone curve generated based on the pixel values of the wide-angle camera image and the pixel values of the telephoto camera image, for example. Details of the color component relationship will be described later.

Figure 2:
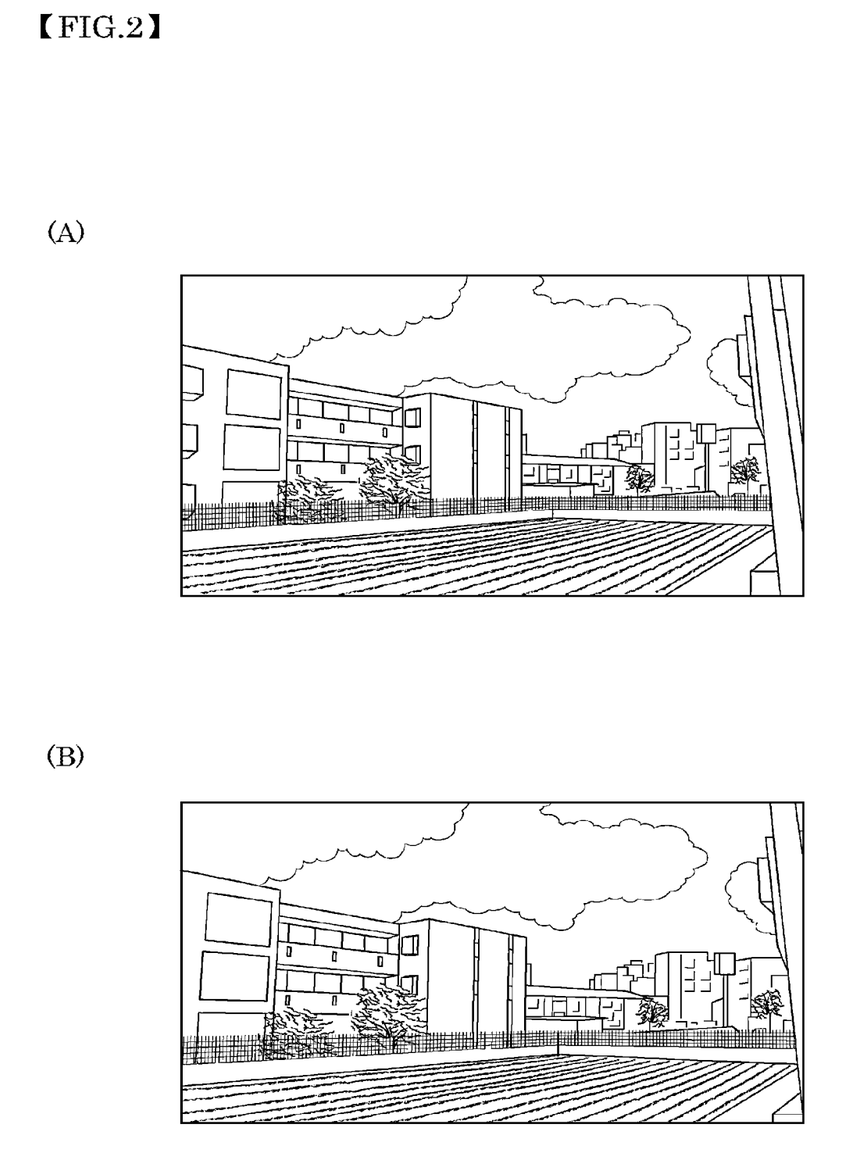
FIG. 2A shows an example of a zoomed wide-angle camera image.
FIG. 2B shows an example of a telephoto camera image.

First, an example of zooming in by gradually increasing the magnification will be described. FIG. 2A illustrates an image zoomed to a predetermined magnification from a wide-angle camera image, and FIG. 2B illustrates a telephoto camera image. When the camera is switched, the displayed screen switches from the image shown in FIG. 2A to the image shown in FIG. 2B. The image shown in FIG. 2A and the image shown in FIG. 2B have already been aligned. Therefore, a large positional deviation does not occur even when the camera is switched. It should be noted that a region that could not be completely corrected by alignment may appear, occlusion may occur due to different lens positions, and a shift in capture timing may occur when capturing images of a moving subject. For this reason, as can be seen from a comparison of FIGS. 2A and 2B, even aligned images do not necessarily match each other on a pixel-by-pixel basis.

Figure 4:
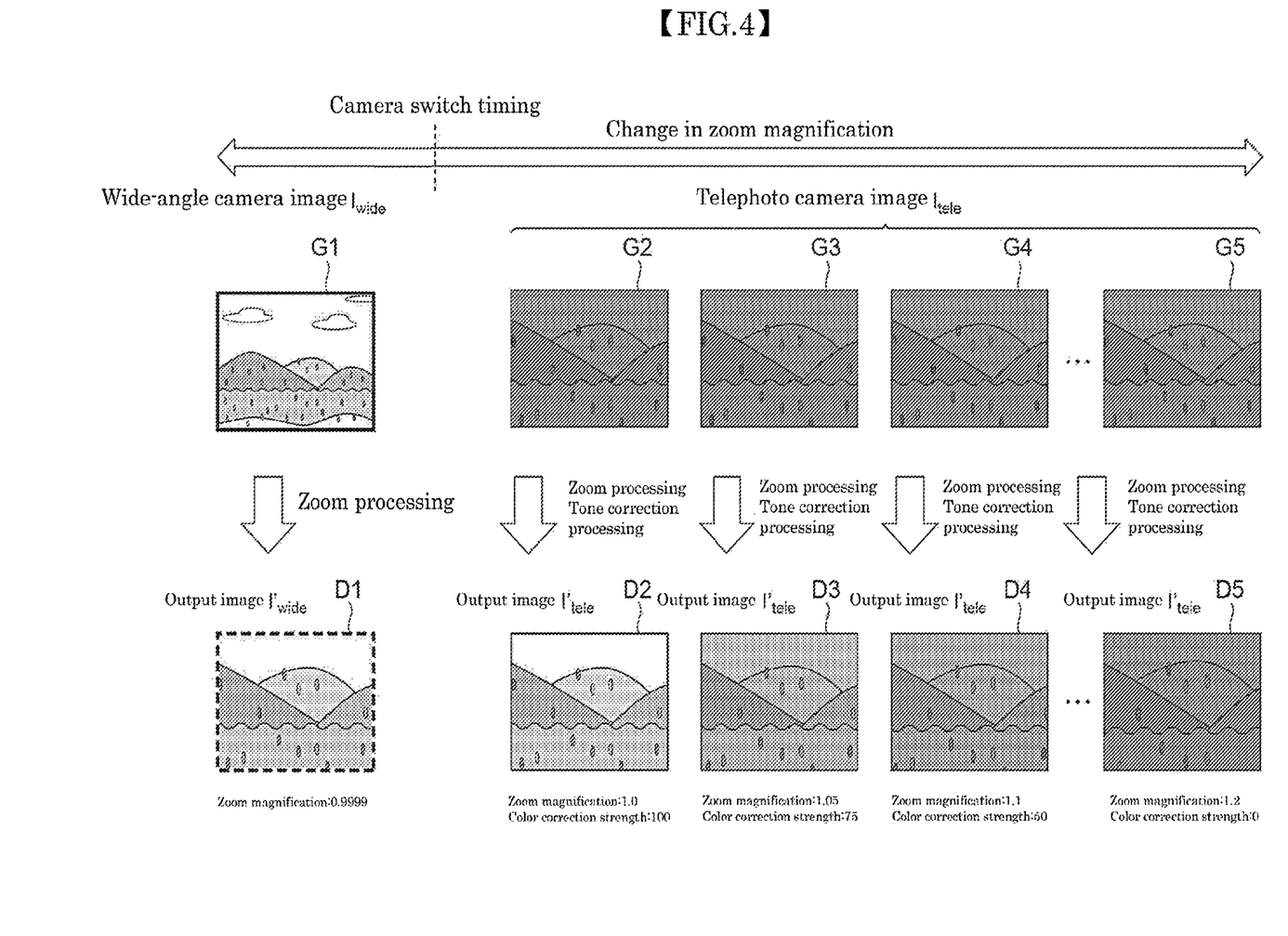
FIG. 4 is a diagram illustrating examples of a preview image.

FIG. 4 is a diagram describing a series of processing performed in the image processing method. In FIG. 4, two rows of images are shown. The group of images in the upper row are images captured by the cameras (wide-angle camera image $I_{wide}$ and telephoto camera images $I_{tele}$), and the group of images in the lower row are the images in the upper row after being subjected to zoom processing (output image $I'_{wide}$ and output image $I'_{tele}$). In other words, the group of images in the upper row are unprocessed images obtained from the camera, and the group of images in the lower row are processed images (preview images). The images in each group are shown in order of magnification in the horizontal direction.

Here, it is assumed that the camera switching threshold value is a magnification of 1.0. If the zoom magnification is set to a value smaller than 1.0 (0.9999 in this example), the processor 12 performs zoom processing on an image G1, which is the wide-angle camera image $I_{wide}$, based on the zoom processing module 132 to generate an image D1, which is the output image $I'_{wide}$. The processor 12 causes the output unit 16 to display the image D1. The image D1 is the image shown in FIG. 2A.

In this case, when the zoom magnification is changed from 0.9999 to 1.0, the processor 12 performs zoom processing on an image G2, which is the telephoto camera image $I_{tele}$, based on the zoom processing module 132. The processor 12 also corrects the tone of the zoomed image based on the correction module 134 to produce an image D2, which is the output image $I'_{tele}$. Details of this correction will be described later. The processor 12 causes the output unit 16 to display the image D2. The image G2 is the image shown in FIG. 2B. In this way, zooming in is executed, and the camera switch timing occurs between the display of the image D1 and the image D2. Thus, an image that has undergone tone correction (image D2) is displayed.

After the switch from the wide-angle camera 10 to the telephoto camera 11, the processor 12 generates the output image $I'_{tele}$ in accordance with the zoom magnification. Accordingly, images D3 to D5 are generated based on images G3 to G5. If the zoom magnification is gradually changed after the camera is switched, the processor 12 may change the extent of tone correction performed on the zoomed image in accordance with the zoom magnification. The extent of correction is the strength of color correction, and the greater the color correction strength is, the greater the strength of correction also is. For example, the processor 12 lowers the color correction strength as the zoom magnification increases from 1.0. For example, the processor 12 sets the color correction strength to 100% when the zoom magnification is 1.0, sets the color correction strength to 75% when the zoom magnification is 1.05, sets the color correction strength to 50% when the zoom magnification is 1.1, and sets the color correction strength to 0% (i.e., no color correction) when the zoom magnification is 1.2. By setting the color correction strength in this way, the image processing device 1 gradually softens the strength of the tone correction as the zoom magnification increases, thus making it possible to achieve a smoother change in image color when the lens is switched. Accordingly, the image processing device 1 can give the user the impression of transition by a single instance of continuous zooming from the wide-angle camera 10 to the telephoto camera 11.

Figure 3:
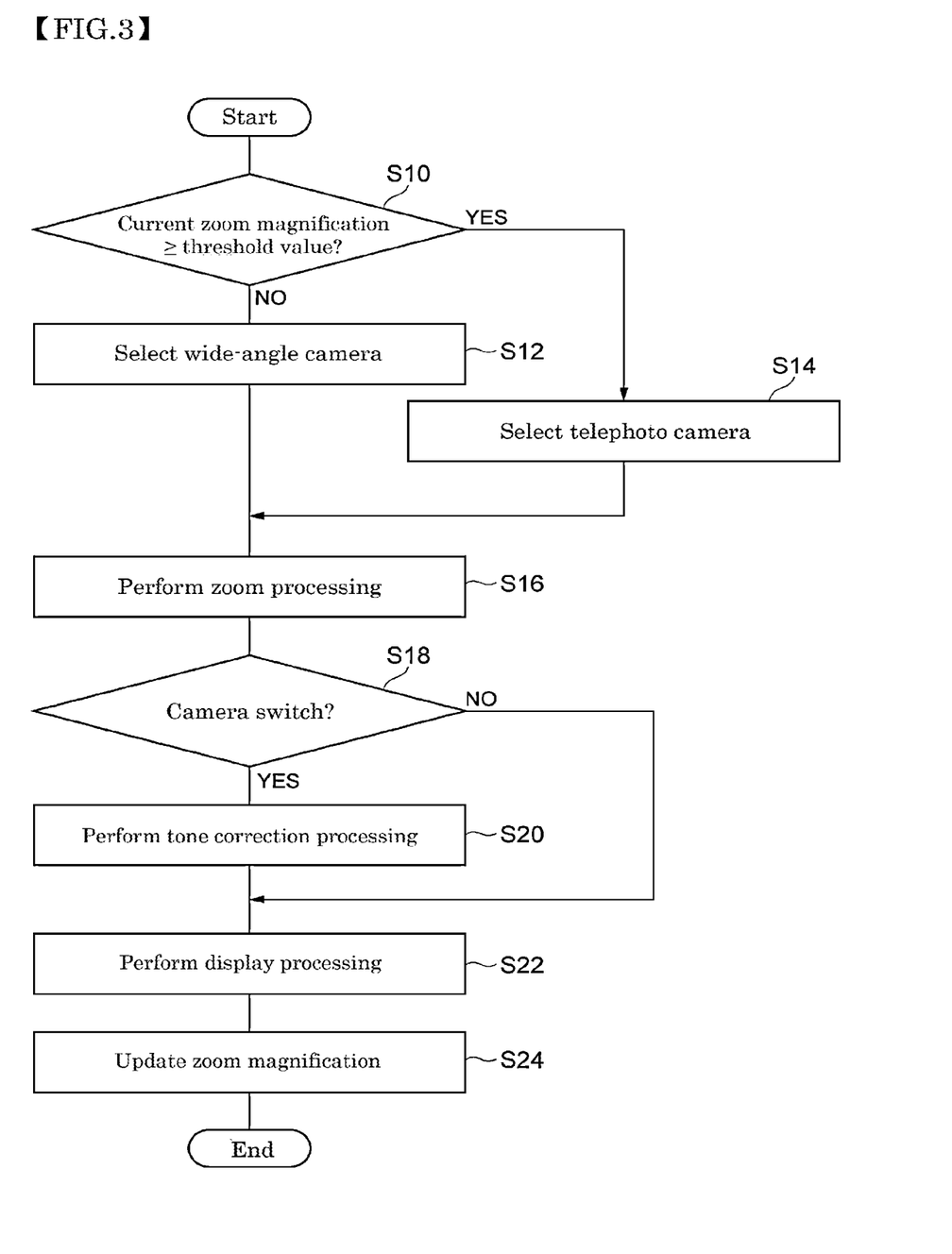
FIG. 3 is a flowchart showing an example of an image processing method.

Although the case of zooming in from the wide-angle camera 10 to the telephoto camera 11 has been described as an example above, this similarly applies to the case of performing processing for zooming out from the telephoto camera 11 to the wide-angle camera 10, and such processing is equivalent to viewing the processing in FIG. 3 from right to left.

(Tone Correction Processing)

Figure 5:
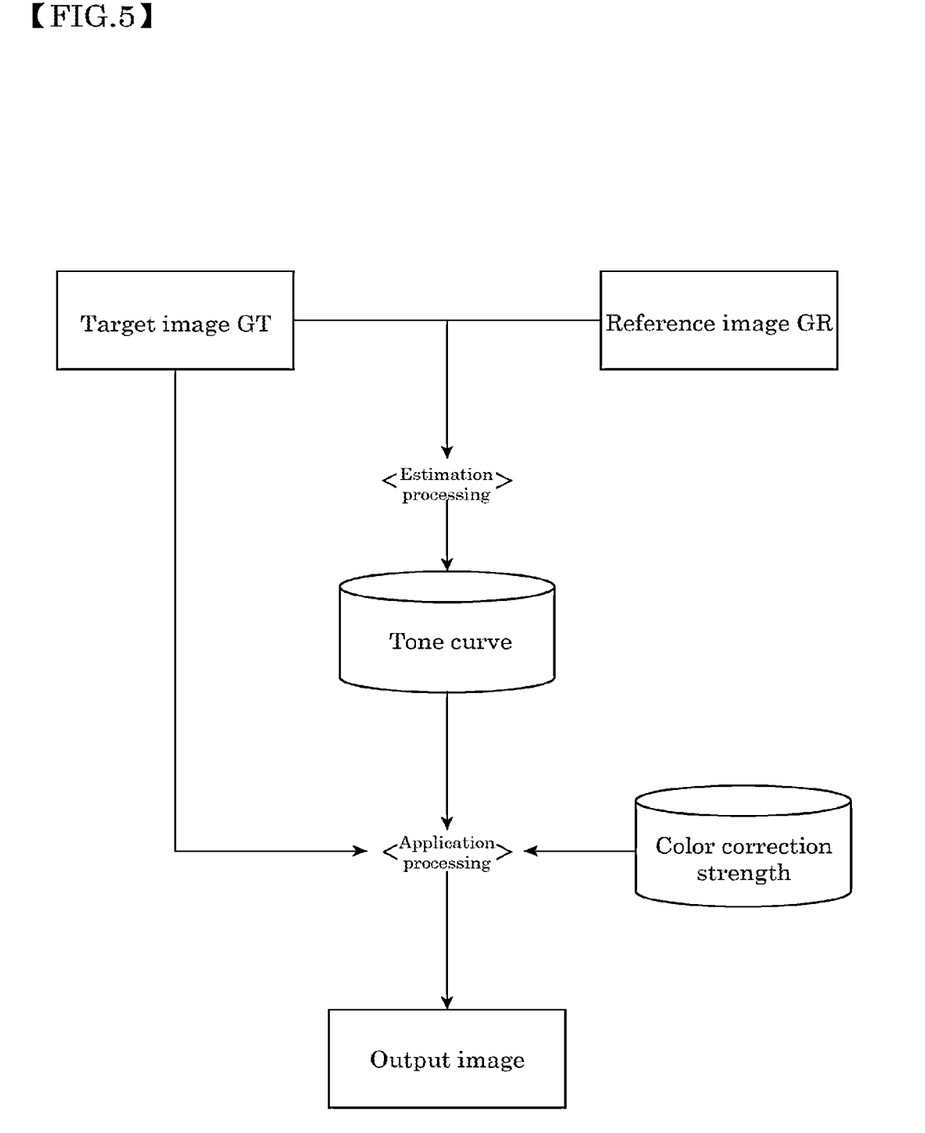
FIG. 5 is a diagram illustrating an example of tone correction processing.

FIG. 5 is a diagram illustrating details of tone correction processing. As shown in FIG. 5, the processor 12 uses two images in tone correction processing, namely a target image GT and a reference image GR. The target image GT is the image to which tone correction is to be applied, and the reference image GR is the image based on which (referenced when) conversion is performed in tone correction. In the present embodiment, the telephoto camera image $I_{tele}$ (e.g., image D2) shown in FIG. 4 is the target image GT, and the output image $I'_{wide}$ (e.g., image D1) is the reference image GR.

First, the processor 12 estimates a tone curve (estimation processing). A tone curve is a conversion formula for tone conversion from the target image GT to the reference image GR. Next, processor 12 corrects the tone of the target image GT based on the estimated tone curve (application processing). As a result, the output image $I'_{tele}$ whose tone has been corrected is generated, as with the image D2 shown in FIG. 3.

(Details of Estimation Processing)

The estimation processing includes histogram calculation, percentile calculation and tone map calculation. In histogram calculation, the processor 12 calculates a histogram of pixel values for each of the YUV channels in both the target image GT and the reference image GR. The processor 12 estimates a tone curve that achieves a match between the histograms of the target image GT and the reference image GR. The processor 12 may set a certain distance between sampled pixels in consideration of the processing cost. The processor 12 also calculates a cumulative histogram at the same time as calculating the histograms, for later processing.

Figure 6:
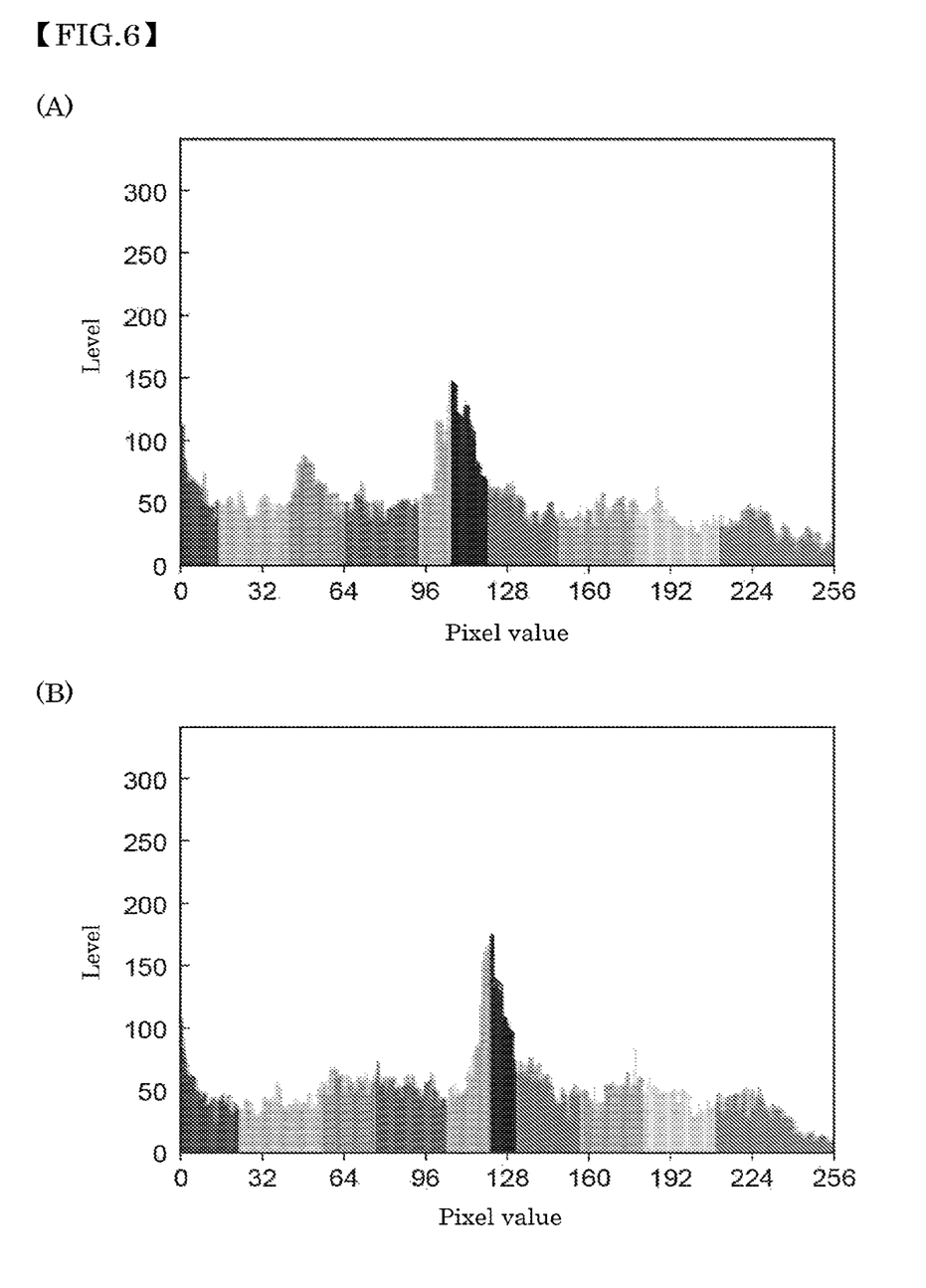
FIG. 6A shows an example of a Y-channel pixel value histogram for a target image.
FIG. 6B shows an example of a Y-channel pixel value histogram for a reference image.

In percentile calculation, the processor 12 uses the cumulative histogram to calculate percentile values at 1%, 10%, 20%, 30%, 40%, 50%, 60%, 70%, 80%, 90%, and 99%. FIG. 6A shows an example of a Y-channel pixel value histogram for the target image, and FIG. 6B shows an example of a Y-channel pixel value histogram for the reference image. The horizontal axis indicates the pixel value, and the vertical axis indicates the level. Since the minimum value and the maximum value of the histogram are susceptible to noise, the 1% and 99% percentiles are employed instead. If the interval between percentiles is set smaller, the accuracy of tone curve estimation increases, but susceptibility to noise increases. For this reason, the interval between percentiles is desirably increments of 10% or 20%. As shown in FIGS. 6A and 6B, histograms in images often have complex shapes rather than normal distributions. For this reason, the percentile method is more effective than a method of matching the mean and variance of the histograms of the target image GT and the reference image GR.

Figure 7:
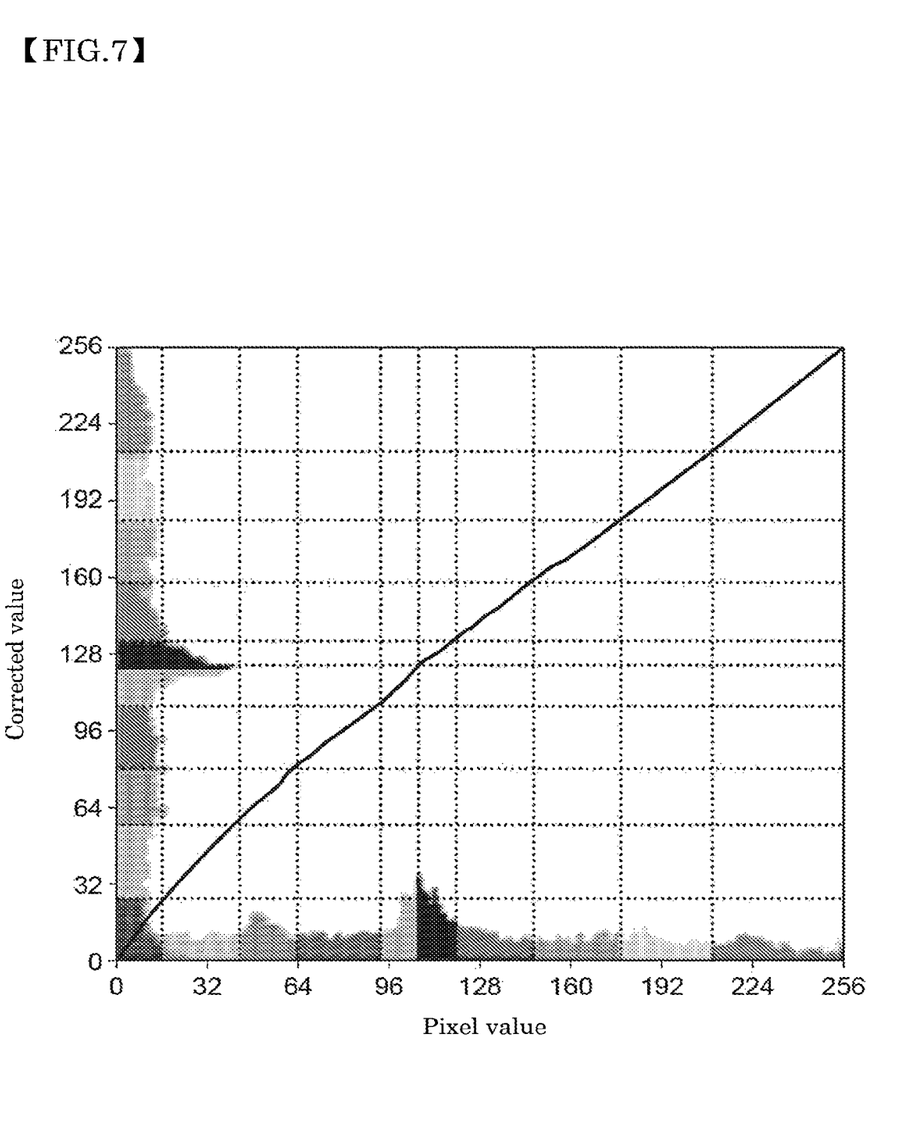
FIG. 7 shows an example of a tone curve.

In tone map calculation, the processor 12 creates a tone curve from the calculated percentile values. FIG. 7 shows an example of a tone curve obtained from FIGS. 6A and 6B. The horizontal axis indicates pixel values, and the vertical axis indicates corrected values (corrected pixel values). Letting "x" be the percentile value in the target image GT, and "y" be the percentile value in the reference image GR, the processor 12 plots the points (x,y) for each corresponding percentile, and connects the plotted points with a polygonal line to create a tone curve. In addition to the Y channel, the processor 12 similarly generates a tone curve for the U channel and the V channel as well.

(Details of Application Processing)

As application processing, the processor 12 converts all pixel values of the target image GT using the estimated tone curve. For efficiency in computation processing, the processor 12 may hold a 256-element lookup table for each YUV channel as the tone curves. The correction strength is set in the range of 0 to 1. When the correction strength is 0, identity conversion is performed using the original pixels of the target image GT as-is, and when the correction strength is 1, conversion is performed using the tone curve as-is. For correction strengths between 0 and 1, conversion is performed in degrees according to linear interpolation. Letting $v_i$ be the input pixel value of a pixel of interest i, T[v] be the lookup table function representing the tone curve, and s be the strength, then an output pixel value $o_i$ is represented by the following expression.

$$o_i = (1-s)v_i + sT[v_i]$$

(Variations of Tone Correction Processing)

Figure 8:
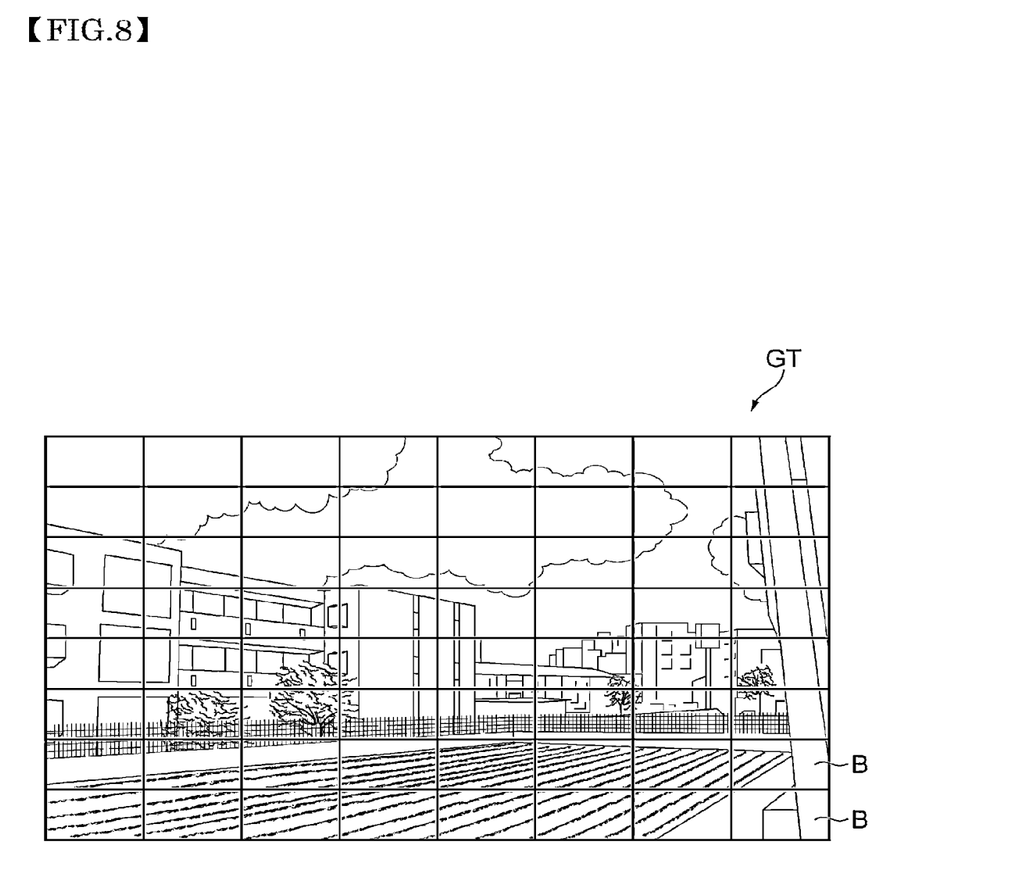
FIG. 8 shows an example of an image divided into blocks.

In order to increase accuracy in tone correction, the image may be divided into small regions, and tone correction may be applied to each region. FIG. 8 shows an example of an image divided into blocks. The target image GT shown in FIG. 8 is divided into 8×8 blocks B. The processor 12 can calculate a tone curve for each block B separately. However, if the tone correction is performed for each block B, there is a possibility that a correction joint may appear at a boundary between blocks B. For this reason, the processor 12 may make correction joints less noticeable by performing bilinear interpolation of the tone correction results between adjacent blocks.

Figure 9:
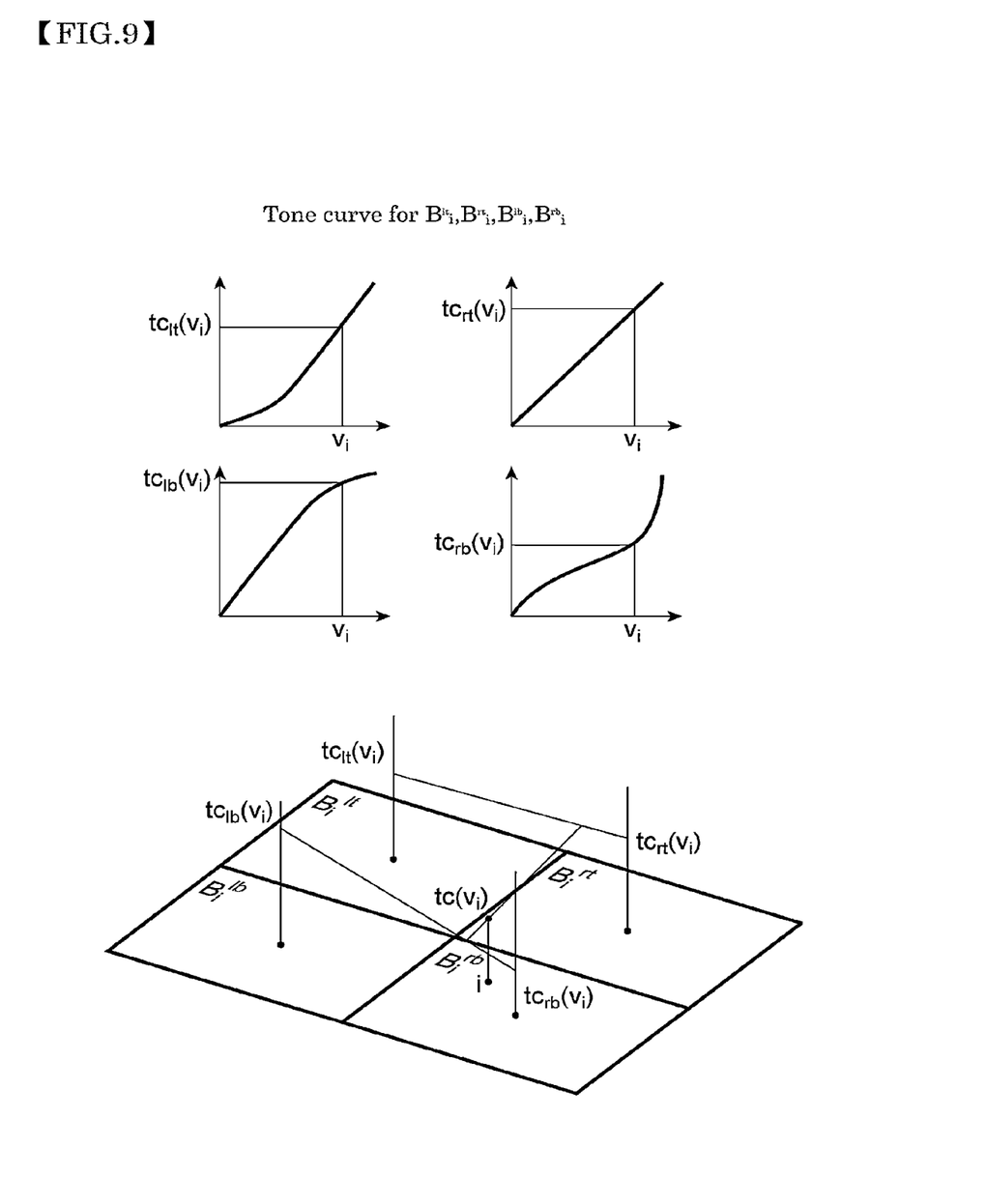
FIG. 9 is a diagram illustrating an example of bilinear interpolation.

FIG. 9 is a diagram illustrating an example of bilinear interpolation. FIG. 9 shows four adjacent blocks $B^{lt}_i$, $B^{rt}_i$, $B^{lb}_i$, and $B^{rb}_i$ at the pixel of interest i (pixel value: $v_i$). Four corresponding tone curves tc are also shown. The processor 12 calculates pixel values $tc_{lt}(v_i)$, $tc_{rt}(v_i)$, $tc_{lb}(v_i)$, $tc_{rb}(v_i)$ based on the four tone curves and the pixel value $v_i$. The processor 12 calculates corrected values (corrected pixel values) based on the calculated pixel values $tc_{lt}(v_i)$, $tc_{rt}(v_i)$, $tc_{lb}(v_i)$, and $tc_{rb}(v_i)$. For example, the processor 12 uses the average value of the pixel values $tc_{lt}(v_i)$, $tc_{rt}(v_i)$, $tc_{lb}(v_i)$, and $tc_{rb}(v_i)$ as the corrected value. This makes it possible to make correction joints less noticeable.

When a histogram is calculated for each block B, there is a possibility that misalignment resulting from incomplete alignment may affect tone correction. For example, assume that the histogram for a predetermined block of the target image GT has a peak in a bright region (e.g., pixel values of 190 or more) and a dark region (e.g., pixel values of 100 or less). It is then assumed that the position of the block shifts due to undergoing translation movement between the target image GT and the reference image GR. In this case, the histogram of the corresponding block of the reference image GR may have deviations in peak shape and position. In this case, the tone correction may cause unintended overcorrection, and artifacts may appear between the peaks in the bright region and the dark region. To prevent such artifacts, the processor 12 may separate the histogram into two regions, namely a bright region and a dark region, determine percentiles for each peak, and create a single tone curve. Letting $x_{trg}$ and $x_{ref}$ be the histogram data for the regions in the target image GT and the reference image GR, the boundary pixel values between the two regions are determined as values $\mu^*$ that minimize the sum of the variances $\sigma^2$ when the data is separated at the pixel values $\mu$. The calculation formula is as follows.

$$\mu^* = \operatorname{argmin}_\mu T(\mu)$$
$$T(\mu) = \sigma^2_{x_{trg} \leq \mu} + \sigma^2_{x_{ref} \leq \mu} + \sigma^2_{x_{trg} > \mu} + \sigma^2_{x_{ref} > \mu}$$
$$S(\mu) = 1 - \frac{T(\mu)}{\sigma^2_{x_{trg}} + \sigma^2_{x_{ref}}}$$

$\sigma^2$: variance (when subscript holds)

$x$: histogram data (256-element list)

In the case of dividing the histogram when calculating percentiles, the percentile values are changed as shown in the table below.

TABLE 1

| No division | 1% | 10% | 20% | 30% | 40% | 50% | 60% | 70% | 80% | 90% | 99% |
|---|---|---|---|---|---|---|---|---|---|---|---|
| With division | Dark region 2% | Dark region 20% | Dark region 40% | Dark region 60% | Dark region 80% | μ* | Bright region 20% | Bright region 40% | Bright region 60% | Bright region 80% | Bright region 98% |

Here, "Dark region X %" means the X % percentile value when the histogram of the dark region is considered to be the entire histogram. A tone curve can be calculated from the above percentile values in the same manner. Also, the histogram division may be performed for only the Y channel. Moreover, the processor 12 may perform histogram division for some blocks B instead of performing histogram division for all blocks B, to avoid unintended quality degradation. For example, the processor 12 may perform histogram division processing only when $S(\mu)$ in the above formula is greater than or equal to a threshold value. $S(\mu)$ is the degree to which the sum of the variances of the data for the bright and dark regions decreases due to dividing the histogram, compared to the variance of the combined histogram data for the target image GT and the reference image GR. The threshold value may be set to approximately 0.7, for example.

(Image Processing Method)

FIG. 3 is a flowchart of the image processing method according to the present embodiment. The flowchart shown in FIG. 3 is executed by the processor 12 upon reception of a user operation or system instruction regarding zooming in or zooming out.

As shown in FIG. 3, first, as determination processing (step S10), the processor 12 determines whether or not the current zoom magnification is greater than or equal to a threshold value. The current zoom magnification is the zoom magnification of the image that is to be displayed. The threshold value is a predetermined zoom magnification for determining whether the wide-angle camera 10 or the telephoto camera 11 is to be used, and is stored as part of the definition data 135 in the memory 13. The processor 12 obtains the threshold value by referencing the memory 13, and compares the obtained threshold value with the current zoom magnification.

In the case of determining that the current zoom magnification is not greater than or equal to the threshold value (step S10: No), the processor 12 selects the wide-angle camera 10 (step S12: example of selection step). In the case of determining that the current zoom magnification is greater than or equal to the threshold value (step S10: YES), the processor 12 selects the telephoto camera 11 (step S14: example of selection step).

Subsequently, as zoom processing (step S16: example of zoom step), the processor 12 crops the central portion of an image captured by the selected camera in accordance with the zoom magnification and performs enlargement processing to enlarge the cropped portion to the original resolution.

Subsequently, as determination processing (step S18), the processor 12 determines whether or not the camera has been switched. The processor 12 determines whether or not the camera has been switched based on the previous value of the zoom magnification and the threshold value used in step S10. The processor 12 determines that the camera has been switched if, for example, the threshold value is between the previous value of the zoom magnification and the current zoom magnification. The previous value of the zoom magnification is stored in the memory 13 as part of the definition data 135.

In the case of determining that the camera has been switched (step S18: YES), as tone correction processing (step S20: example of correction step), the processor 12 corrects the tone of the zoomed image. The processor 12 generates a tone curve indicating the color component relationship between the target image GT and the reference image GR. The processor 12 determines the color correction strength based on the current zoom magnification. The processor 12 then corrects the tone of the target image GT based on the tone curve and the color correction strength.

When the tone correction processing (step S20) ends, or if it is determined that the camera has not been switched (step S18: No), as display processing (step S22: example of display control step), the processor 12 causes the output unit 16 to display the image.

Next, as update processing (step S24), the processor 12 updates the zoom magnification stored in the memory 13. For example, the processor 12 overwrites the previous value of the zoom magnification with the current zoom magnification. When the update processing (step S24) ends, the flowchart shown in FIG. 3 ends. The flowchart shown in FIG. 3 starts again from the beginning when the processor 12 next receives a user operation or system instruction regarding zooming in or zooming out.

Summary of First Embodiment

In the image processing device 1, based on the selection module 131, either the wide-angle camera 10 or the telephoto camera 11 is selected in accordance with the set zoom magnification. Based on the zoom processing module 132, a region with a size corresponding to the zoom magnification is cropped from an image captured by the selected camera, and zoom processing is performed to enlarge the cropped region. The image obtained by the zoom processing is displayed on the output unit 16 based on the display control module 133. If, based on the selection module 131, the camera that captures the image to be displayed on the output unit 16 is switched in accordance with a gradual change of the zoom magnification during zoom processing, based on the color component relationship between the wide-angle camera image and the telephoto camera image, the tone of the zoomed image to be displayed immediately after the switch is corrected so as to approach the tone of the zoomed image that was displayed immediately before the switch. For this reason, continuity of tone is maintained even when the camera is switched. Accordingly, the image processing device 1 can suppress a discontinuous change between images caused by switching between cameras that have different angles of view.

Second Embodiment

An image processing device according to a second embodiment is the same as the image processing device according to the first embodiment with the exception of the reference image GR selection logic and the operations of the wide-angle camera 10 and the telephoto camera 11. The following description focuses mainly on differences from the first embodiment, and redundant descriptions will be omitted.

(Configuration of Image Processing Device)

The configuration of the image processing device according to the second embodiment is the same as that of the image processing device according to the first embodiment, with the exception of portions of the zoom processing module 132 and correction module 134. In the first embodiment, when zooming out from the telephoto camera 11 to the wide-angle camera 10, that is to say when processing is performed from right to left in FIG. 4, a wide-angle camera image obtained before the lens switch (the image G1 in FIG. 4,) is required for color correction of the telephoto camera image. In other words, the two cameras need to always be activated at the same time.

In order to reduce the power consumption required to keep the two cameras activated at the same time, the processor 12 according to the present embodiment selects an image from a previous frame of the same camera as the reference image GR that is referenced during tone correction. Accordingly, processing for continuous matching with the tone of the previous frame is realized. When a lens switch occurs, the processor 12 applies tone correction with a strength of 1.0 to the tone of the image of the previous frame. The processor 12 continues to apply tone correction in successive frames with gradually decreasing strengths. The processor 12 ends the application of tone correction after a certain number of frames have been captured after the lens switch. The above-described processing is the same processing not only for switching from the wide-angle camera 10 to the telephoto camera 11, but also for switching from the telephoto camera 11 to the wide-angle camera 10. For example, in the case of zooming in, the image captured immediately before the camera switch is an image zoomed from a wide-angle camera image to a predetermined magnification, and the image captured immediately after the camera switch is an image zoomed from a telephoto camera image to a predetermined magnification (including a magnification of 1). As another example, in the case of zooming out, the image captured immediately before the camera switch is an image zoomed from a telephoto camera image to a predetermined magnification (including a magnification of 1), and the image captured immediately after the camera switch is an image zoomed from a wide-angle camera image to a predetermined magnification.

Note that in the case of using the image of the previous frame as the reference image GR, the angle of view between the reference image GR and the target image GT may differ by a large amount. In particular, in the case where tone correction is performed for each block of an image divided into blocks, the difference in angle of view may be significant. For this reason, in the image processing device according to the second embodiment, a configuration is possible in which tone correction is not performed for each block, and tone correction is only performed on the entire image, and a configuration is possible in which the tone correction function is turned off for a scene in which the angle of view is envisioned to become large, such as in the case of rapid zooming.

Summary of Second Embodiment

With the image processing device according to the second embodiment, an image of a previous frame of the same camera is selected as the reference image GR that is referenced during tone correction, thus eliminating the need to keep the two cameras activated at all times. Therefore, this image processing device enables a reduction in power consumption.

(Variations)

Although embodiments of the present disclosure have been described above, the present disclosure is not limited to the above-described embodiments. For example, as an example of dividing an image into blocks and performing tone correction for each block, the case where an image is divided into 8×8 blocks has been described, but the number of blocks is not limited to this. For example, an image may be divided into 2×2 blocks or 4×4 blocks. Also, a configuration is possible in which tone correction is performed without block division, tone correction is performed with 2×2 division, correction is performed with 4×4 division, and correction is performed with 8×8 division, and the results of such correction are weighted and adjusted to obtain a final correction result. As an example of adjustment, when the zoom change is slow, the change in the angle of view is small, and therefore a higher weight is given to the result of correction performed with division into 8×8 blocks, whereas when the zoom change is large, a higher weight is given to the result of correction performed without division into blocks in order to suppress artifacts. Also, the number of cameras is not limited to two, and three or more cameras may be included. Moreover, the above embodiments of the present disclosure mainly focus on real-time processing such as previewing when capturing a still image, but the technology of the present disclosure is also applicable when capturing a moving image or processing a still image.

The invention claimed is:

1. An image processing device comprising:
a first camera;
a second camera having a different angle of view from the first camera;
a processor configured to generate a preview image from an image captured by the first camera and an image captured by the second camera; and
a display configured to display the preview image,
wherein in a case of a change in camera usage from the first camera to the second camera due to a change in a zoom magnification, a tone of an image that was captured by the second camera and is to be displayed first on the display is brought closer to a tone of an image that was captured by the first camera and was displayed last on the display, in comparison with a case where the captured images are used as-is,
wherein the processor generates a first image by performing tone correction without division into regions and a second image by performing tone correction separately for each of a plurality of regions, and, when generating the preview image, gives a higher weight to the second image as a speed of change in the zoom magnification decreases and gives a higher weight to the first image as the speed of change in the zoom magnification increases.

2. An image processing method comprising:
displaying a zoom preview image based on a image captured by a first camera and on a image captured by a second camera having a different angle of view from the first camera;
changing a zoom magnification of the zoom preview image in a stepwise manner;
performing control such that in a case of a change in camera usage from the first camera to the second camera due to a change in the zoom magnification, a tone of a first zoom preview image after the change in camera usage is brought closer to a tone of a last zoom preview image before the change in camera usage, in comparison with a case where the first zoom preview image and the last zoom preview image are used as-is; and
generating a first image by performing tone correction without division into regions and a second image by performing tone correction separately for each of a plurality of regions. and, when generating the preview image, gives a higher weight to the second image as a speed of change in the zoom magnification decreases and gives a higher weight to the first image as the speed of change in the zoom magnification increases.

* * * * *